(12) United States Patent
Finkle

(10) Patent No.: US 11,616,430 B2
(45) Date of Patent: Mar. 28, 2023

(54) METHOD OF MANUFACTURING A MAGNETIC GEAR MODULATOR OF A CONCENTRIC MAGNETIC GEAR

(71) Applicant: Louis J. Finkle, Lakewood, CA (US)

(72) Inventor: Louis J. Finkle, Lakewood, CA (US)

( * ) Notice: Subject to any disclaimer, the term of this patent is extended or adjusted under 35 U.S.C. 154(b) by 0 days.

(21) Appl. No.: 17/665,342

(22) Filed: Feb. 4, 2022

(65) Prior Publication Data

US 2022/0278601 A1 Sep. 1, 2022

Related U.S. Application Data

(60) Provisional application No. 63/145,856, filed on Feb. 4, 2021.

(51) Int. Cl.
| | |
|---|---|
| *B29C 39/02* | (2006.01) |
| *H02K 49/10* | (2006.01) |
| *B29C 45/00* | (2006.01) |
| *B29C 45/14* | (2006.01) |
| *H02K 15/12* | (2006.01) |
| *B29L 31/00* | (2006.01) |

(52) U.S. Cl.
CPC ......... *H02K 49/102* (2013.01); *B29C 39/02* (2013.01); *B29C 39/021* (2013.01); *B29C 45/0005* (2013.01); *B29C 45/14467* (2013.01); *H02K 15/12* (2013.01); *B29C 2793/0027* (2013.01); *B29K 2995/0008* (2013.01); *B29K 2995/0013* (2013.01); *B29L 2031/748* (2013.01)

(58) Field of Classification Search
CPC .......... B29C 45/0005; B29C 45/14467; B29C 39/02; B29C 39/021; B29C 2793/0027
See application file for complete search history.

(56) References Cited

U.S. PATENT DOCUMENTS

| | | | | |
|---|---|---|---|---|
| 10,476,349 | B2* | 11/2019 | Toliyat | H02K 7/116 |
| 10,530,233 | B2* | 1/2020 | Hawksworth | H02K 15/03 |
| 2014/0167546 | A1* | 6/2014 | Sutani | H02K 49/102 |
| | | | | 310/103 |
| 2020/0295648 | A1* | 9/2020 | Hawksworth | H01F 7/0205 |

OTHER PUBLICATIONS

Cameron. "Lessons Learned in Fabrication of a High-Specific-Torque Concentric Magnetic Gear" VFS 7th Annual Forum and Technology Display. May 16, 2019. Retrieved from related PCT application PCT/US2022/15356. (Year: 2019).*

* cited by examiner

*Primary Examiner* — Edmund H Lee
(74) *Attorney, Agent, or Firm* — Averill, Green & Kim; Philip Y Kim; Kenneth L. Green

(57) ABSTRACT

A Magnetic Gear Modulator (MGM) of a Concentric Magnetic Gear (CMG) is manufactured by injection molding a modulator cage over angularly spaced apart MGM pole pieces made of a magnetically conducting material. The pole pieces are initially connected by a support ring, or held by a fixture. The modulator cage is preferably a thermally conductive strengthening fiber filled plastic, a carbon fiber plastic, a carbon fiber filled plastic material, a glass material, or a high performance composite plastic molding material. After molding, the outer and/or inner portions of the molding material, and support ring if present, are machined away preferably exposing both inner and outer faces of the pole pieces embedded in the modulator cage. An MGM made using injection molding over a connected support ring and pole pieces reduces cost, and a carbon fiber plastic modulator cage increases strength.

17 Claims, 7 Drawing Sheets

METHOD OF MANUFACTURING A MAGNETIC GEAR MODULATOR OF A CONCENTRIC MAGNETIC GEAR

CROSS-REFERENCE TO RELATED APPLICATIONS

The present application claims the priority of U.S. Provisional Patent Application Ser. No. 63/145,856 filed Feb. 4, 2021, which application is incorporated in its entirety herein by reference.

BACKGROUND OF THE INVENTION

The present invention relates to magnetic power transmission devices and in particular to a Magnetic Gear Modulator (MGM) of a Concentric Magnetic Gear (CMG).

The CMG generally includes inner and outer Permanent Magnet (PM) rotors having alternating north south pole permanent magnet pairs and the MGM is a center rotor between the inner and outer rotors and including magnetically conductive pole pieces between PM pairs of the inner and outer rotors. The ratio of the CMG is defined by the ratio of PM pairs of the inner and outer rotors. The number of pole pieces in the MGM is the sum of the number of PM pairs in the inner and outer rotors. For example, for a four PM pair inner rotor and a ten PM pair outer rotor, the number of pole pieces in the MGM is 14. The CMG ratio would be ten over four, which is equal to 2.5:1 with the outer rotor rotating slower than the inner rotor. The MGM is the heart of the CMG and has been the most significant challenge to cost effective production.

Lessons Learned in Fabrication of a High-Specific-Torque Concentric Magnetic Gear presented at VFS 75th Annual Forum and Technology Display Philadelphia, Pa. May 16, 2019, by Zachary Cameron et. al., describes a modulator pole-ring machined off after assembly or casting. Unfortunately, know method for manufacturing the MGM are very expensive. The Lessons Learned in Fabrication of a High-Specific-Torque Concentric Magnetic Gear presentation is herein incorporated by reference.

Other known methods include manufacturing the MGM with a thin 1-2 mm band which holds modulator pole pieces in place without post machining of pole piece holding band. Ideally the thinner the air gaps the higher performance the CMG increasing the torque and reducing iron losses. Unfortunately, the thin bands lack strength for many applications.

BRIEF SUMMARY OF THE INVENTION

The present invention addresses the above and other needs by providing a Magnetic Gear Modulator (MGM) of a Concentric Magnetic Gear (CMG) which is manufactured using injection molding of a modulator cage of a high performance composite plastic, thermally conductive injection molding material over a support ring and angularly spaced apart modulator pole pieces. The injection molding material is preferably a carbon fiber plastic material or the like. The support ring and pole pieces are made of magnetically conductive material and preferably a single piece casting. After injection molding, outer portions of the injection molding material and the support ring are machined away leaving angularly spaced apart pole pieces embedded in the modulator cage comprising the remaining molding material. The MGM made using injection molding reduces cost and the carbon fiber plastic material increases strength.

In accordance one another aspect of the invention, there is provided an outside or inside support ring and pole pieces, made of magnetically conductive material. The pole pieces reach in from an outside support ring, or out from an inside support ring.

In accordance with another aspect of the invention, there is provided an MGM constructed by injection molding the molding material, over the support ring and pole pieces. The support ring and an outer or inner portion of the injection molding material, are machined away, leaving both inner and outer faces of the pole pieces exposed. The modulator cage resides between the angularly spaced apart magnetically conductive pole pieces securing the pole pieces, creating the MGM.

In accordance with yet another aspect of the invention, there is provided an MGM preferably having exposed inner and outer pole piece faces. The exposed pole piece faces increase torque capability. However, in some embodiments, either the inner or outer faces of the pole pieces opposite to the support ring may be covered by a layer of molding material.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1A:
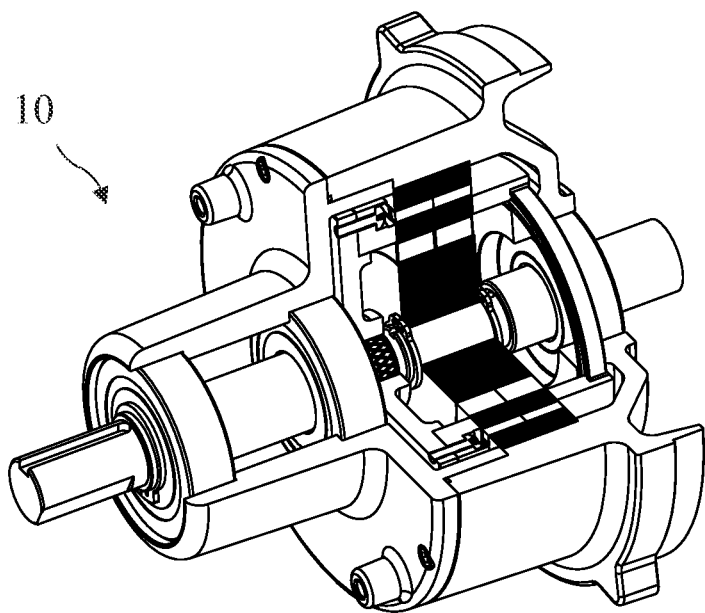
FIG. 1A shows a first cut-away view of a Concentric Magnetic Gear (CMG).
Figure 1B:
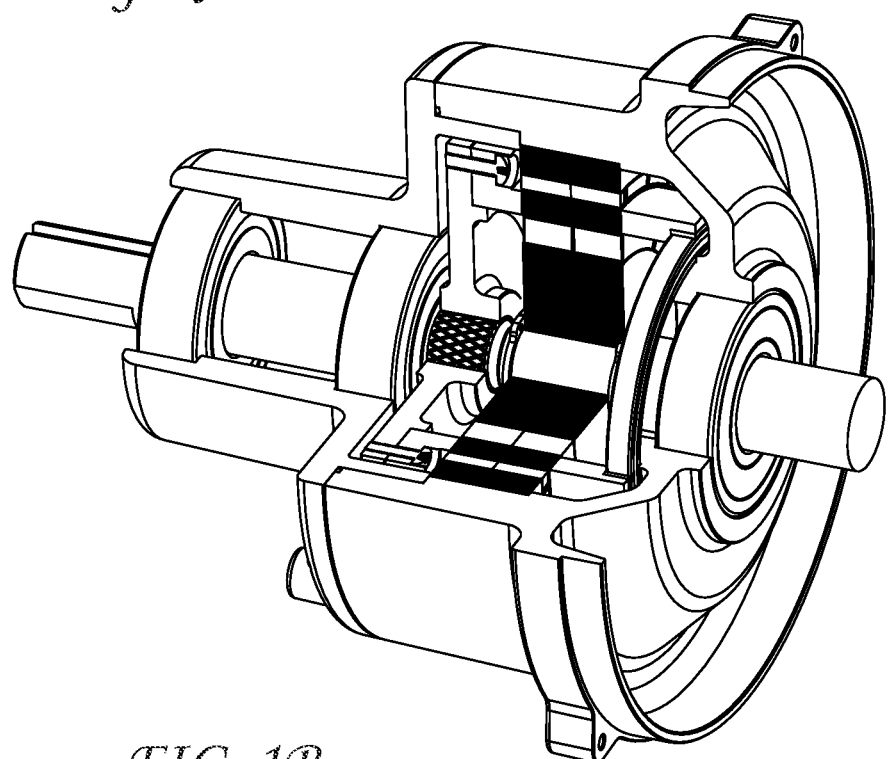
FIG. 1B shows a second cut-away view of the CMG.

A first cut-away view of a Concentric Magnetic Gear (CMG) 10 is shown in FIG. 1A and a second cut-away view of the CMG 10 is shown in FIG. 1B.

Figure 2:
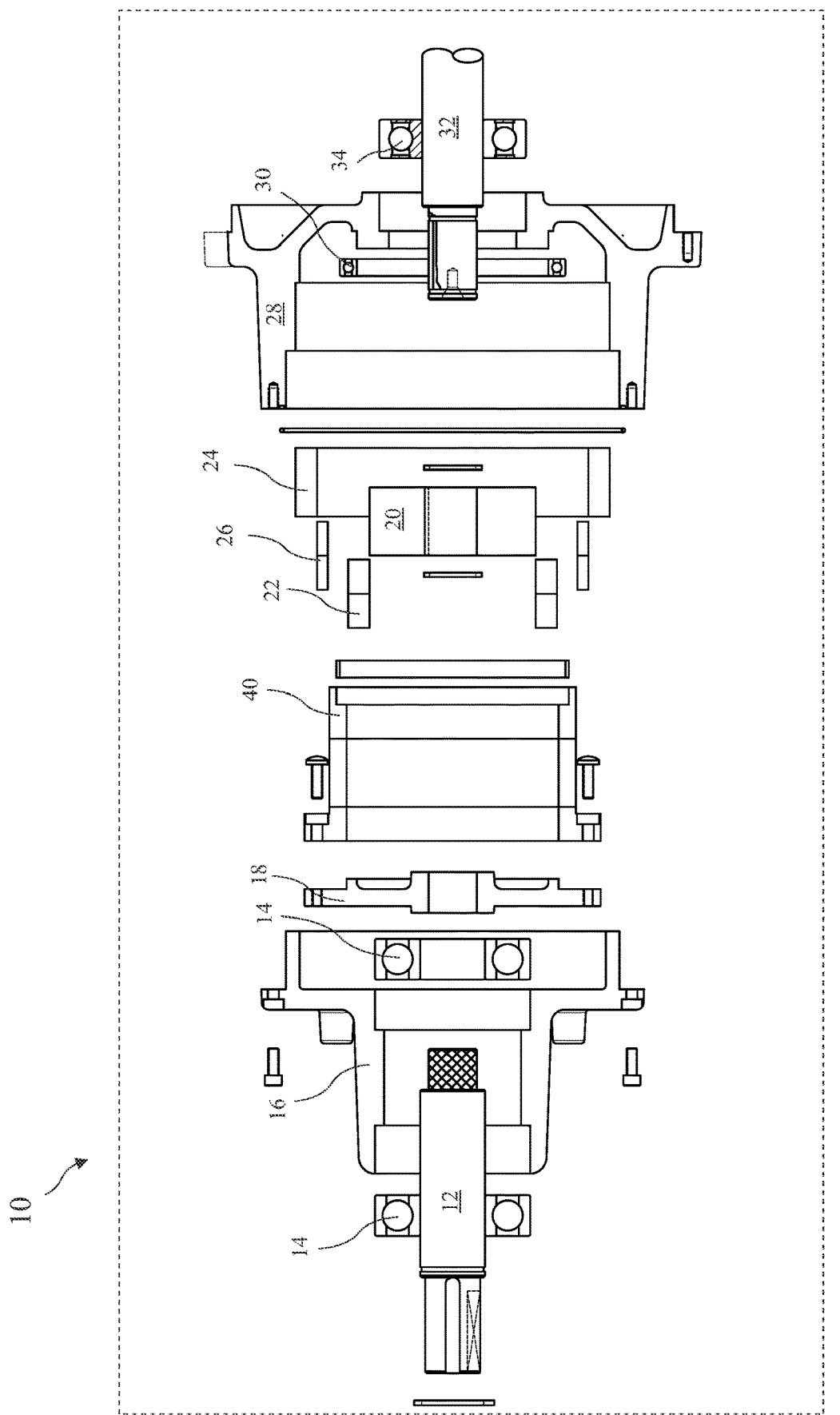
FIG. 2 shows an exploded view of a CMG according to the present invention.

An exploded view of the CMG 10 is shown in FIG. 2. The CMG 10 includes an output shaft 12, output shaft bearings 14, a front gear housing 16, a modulator plate 18, a Magnetic Gear Modulator (MGM) 40, an inner rotor 20, inner rotor magnets 22, an outer rotor 24, outer rotor magnets 26, a back gear housing 28, an MGM support bearing 30, an input shaft 32, and an input shaft bearing 34. In this embodiment, the output shaft 12 is attached to rotate with the MGM 40. Further, the MGM support bearing 30 is selected to maintain rigidity and concentricity of the MGM 40 and to conduct heat from the MGM 40, The MGM support bearing 30 is preferably retained in the CMG 10 using a glue, a mechanical retainer, crimping material over the MGM support bearing 30, or a similar retaining method.

The CMG 10 functions like a planetary or epicyclic gear. In some embodiments, the MGM may be fixed and in some embodiments the inner rotor 20 may be an input and the outer rotor 24 may be an output. Those skilled in the art will recognize various embodiments of CMGs including an MGM, and any CMG including an MGM constructed as described here is intended to come within the scope of the present invention.

Figure 4:
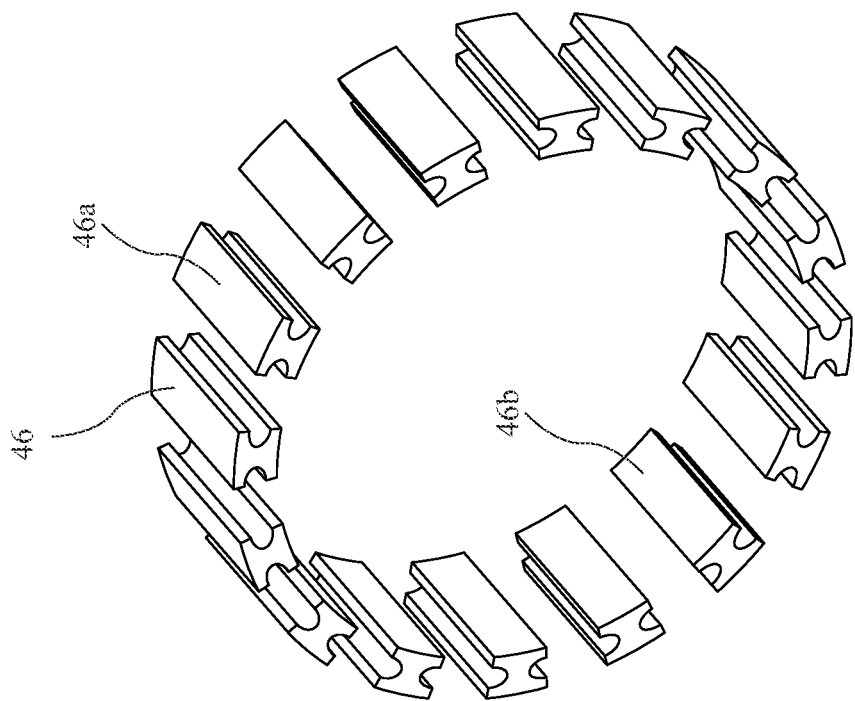
FIG. 4 shows the pole pieces after removing the support ring, according to the present invention, of the CMG.
Figure 3:
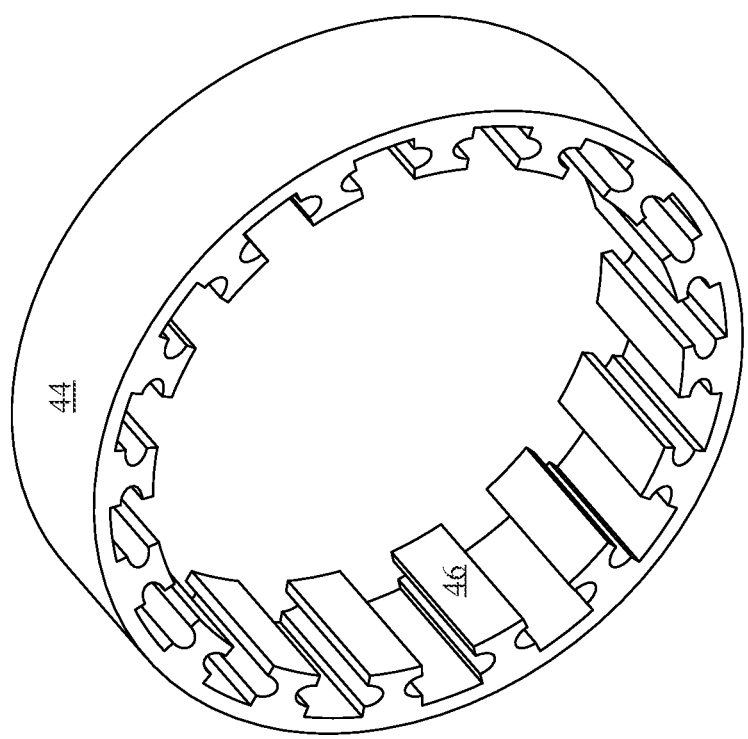
FIG. 3 shows the attached support ring and pole pieces of magnetic material before machining, according to the present invention, of the CMG.

An outer support ring 44 and angularly spaced apart pole pieces 46 before machining is shown in FIG. 3, and pole pieces 46 after machining off an outer portion of molding material and the outer support ring 44, are shown in FIG. 4, injection molding material 42 and 42a between the pole pieces 46 (see FIGS. 5 and 6) is not shown. The outer support ring 44 is preferred, but an inner support ring, or end support rings, may replace the outer support ring 44. The support ring 44 and pole pieces 46 are a magnetically conducting material, for example, a ferromagnetic material, a bulk magnetic or metallic glass, a laminated bulk magnetic glass, or Soft Magnetic Composites (SMC). The pole pieces 46 are preferably a non-round cross-section to resist rotation. A preferred cross-section is an hourglass shape, but may be any shape resisting rotation in the completed CMG 10. The pole pieces 46 have outer faces 46a and inner faces 46b.

The outer support ring 44 and angularly spaced apart pole pieces 46 may be, for example, a single piece casting, machined from a single piece of material, or a cylinder with pole pieces attached inside. Those skilled in the art will recognize various ways to form a support ring and attached angularly spaced apart pole pieces, and any MGM made by molding material over a combined support ring and angularly spaced apart pole pieces is intended to come within the scope of the present invention.

Figure 5:
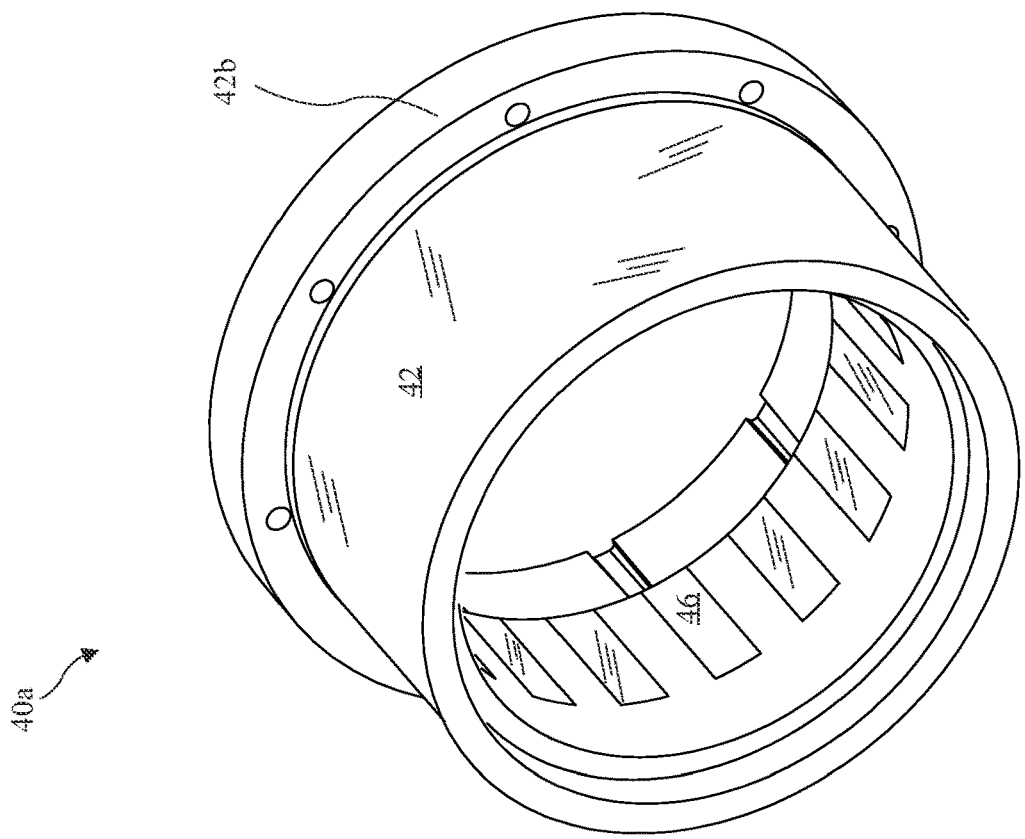
FIG. 5 shows an injection molded modulator cage molded over the support ring and pole pieces of magnetic material, according to the present invention, of the CMG.

After obtaining a combined support ring and pole pieces, the next step in manufacturing the MGM 40 is a raw molded MGM 40a comprising a molding material 42 over the support ring 44 and pole pieces 46, shown in FIG. 5. The molding material 42 is preferably a high strength thermally conductive material, for example, a thermally conductive strengthening fiber filled plastic, a carbon fiber plastic, a carbon fiber filled plastic material, a glass material, or a high performance composite plastic. Thermal conductivity and is important because of eddy current and hysteresis losses that generate heat in the MGM 40. The MGM 40 resides between the inner and outer rotors 20 and 24 so heat needs to escape through an MGM base 42b and through the support bearing 30 (see FIG. 2). The pole pieces 46 are preferably held in position during molding the molding material 42 by connection to the support ring 44, but may be individual and held by a fixture. The MGM base 42b is preferably part of the molding material 42, but may be a separate piece attached to the molding material 42.

Figure 6:
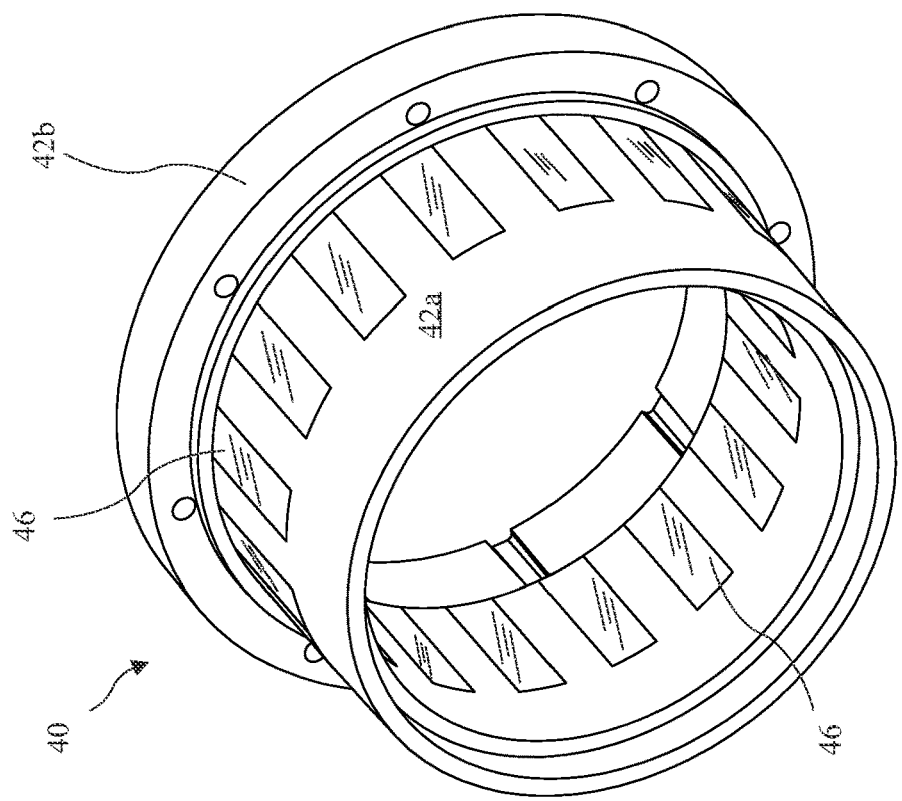
FIG. 6 shows the pole pieces embedded in the remaining injection molding material after machining away an outer portion of the injection molding material and the support ring, according to the present invention.

The MGM 40, after machining away excess molding material 42 and the support ring 44 covering the pole pieces 46, is shown in FIG. 6. The MGM base 42b remains, and a modulator cage 42a, a portion of the molded material 42, remains holding the pole pieces 46.

Figure 7A:
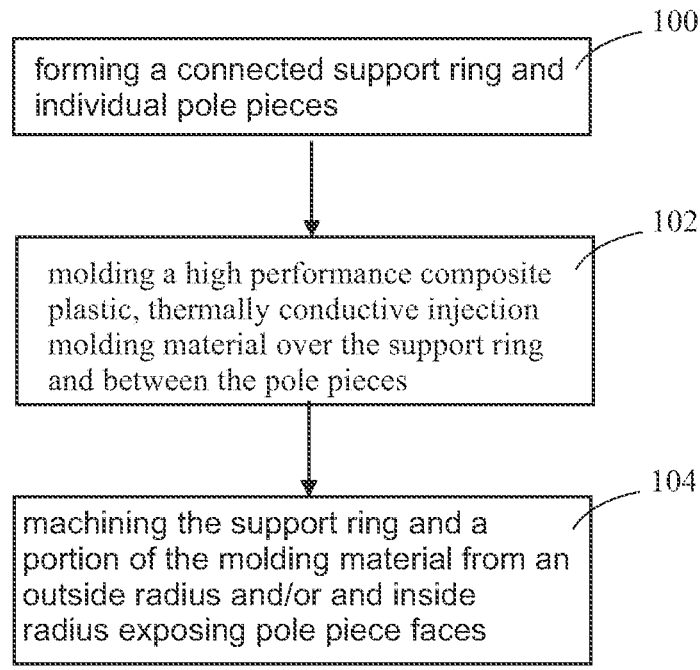
FIG. 7A shows a first method of manufacturing the MGM according to the present invention.

FIG. 7A shows a first method for making an MGM 40. The method includes forming a connected support ring and individual pole pieces at step 100, molding a high performance composite plastic, thermally conductive injection molding material over the support ring and between the pole pieces at step 102, and machining the support ring and a portion of the molding material from an outside radius and/or and inside radius exposing the pole piece faces at step 104. In step 102, it is not necessary to mold the molding material over the support ring. In step 104, it is not necessary to machine the molding material if the molding material does not extend radially beyond the gaps between the pole pieces or axially outside the finished dimensions of the MGM which may include the MGM base, or is only a layer of molding material over pole piece faces opposite to the support ring. However, it is preferred to expose both inner and outer faces of the pole pieces to improve efficiency.

Figure 7B:
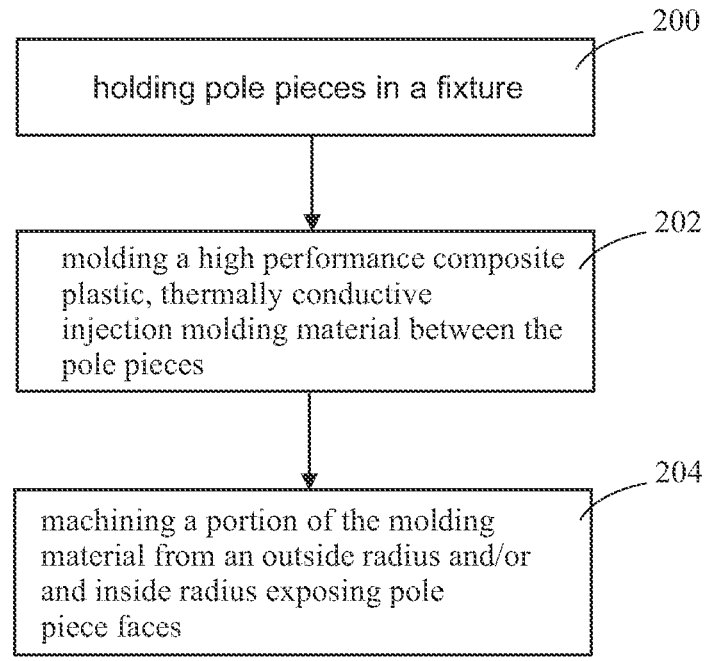
FIG. 7B shows a second method of manufacturing the MGM according to the present invention.

FIG. 7B shows a second method for making an MGM 40. The method includes holding pole pieces in a fixture at step 200, molding a high performance composite plastic, thermally conductive injection molding material between the pole pieces at step 202, and machining a portion of the molding material from an outside radius and/or and inside radius exposing the pole pieces at step 204.

Figure 8:
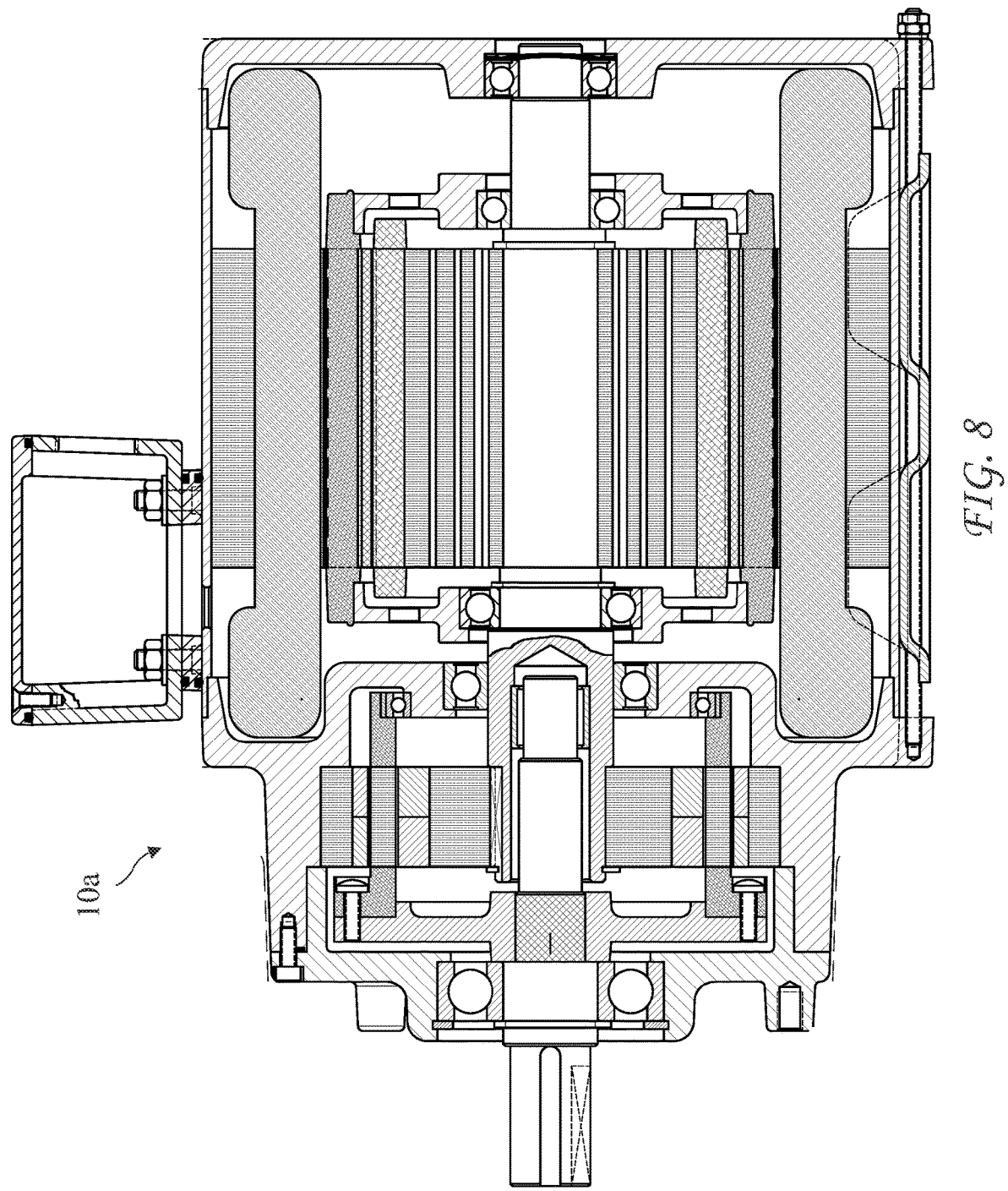
FIG. 8 shows a second embodiment of the CMG according to the present invention.
Figure 9:
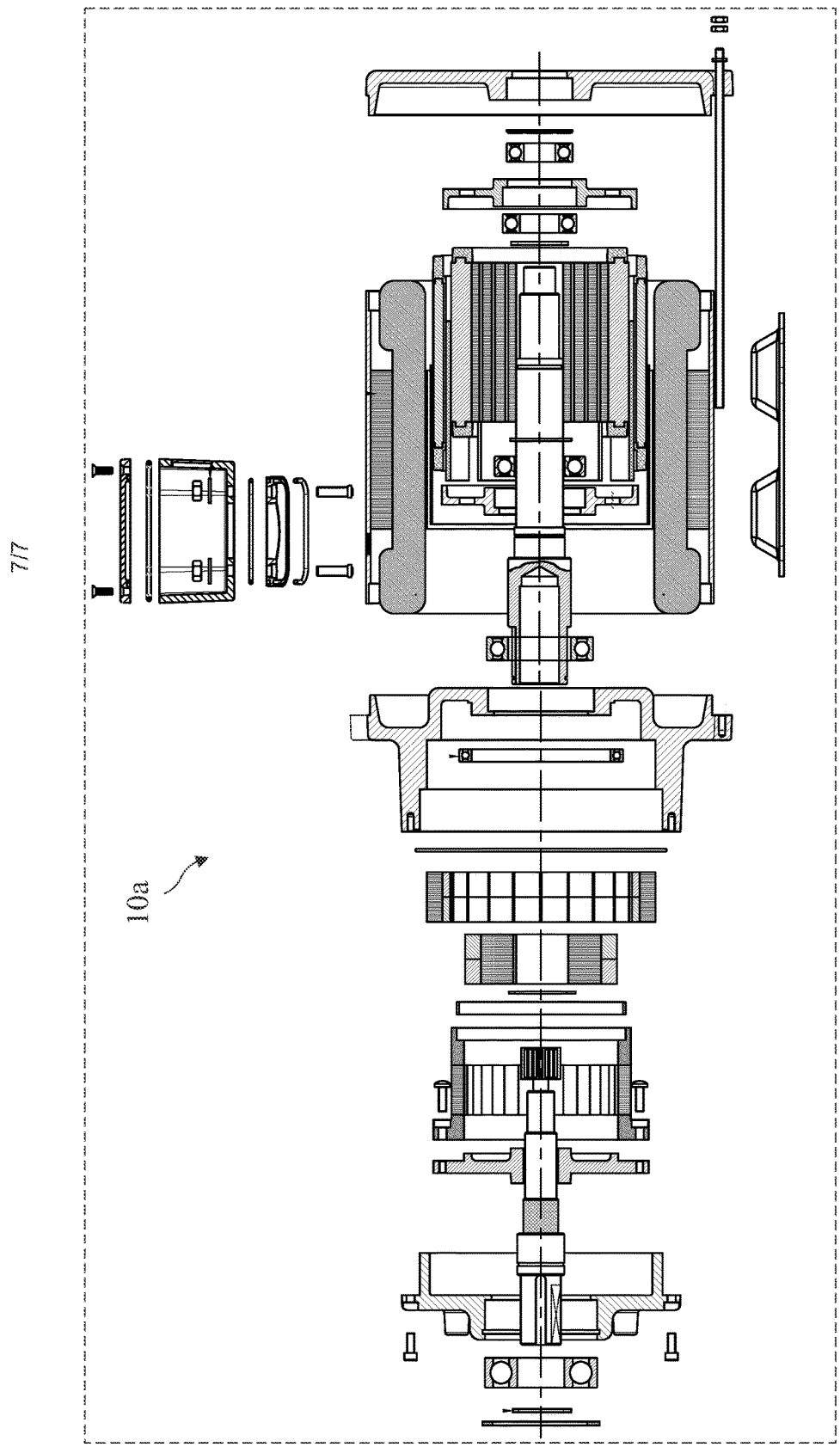
FIG. 9 shows an exploded view of the second embodiment of the CMG according to the present invention.

FIG. 8 shows a second embodiment of the CMG 10a according to the present invention and FIG. 9 shows an exploded view of the second embodiment of the CMG 10a. The output shaft of the CMG 10a is supported by a large bearing in front of the housing and the output shaft is also supported by a needle bearing which is located in the hollow input shaft of the motor.

While an MGM 40 construction by injection molding a modulator support cage 42 over the MGM pole pieces 46 on an interior of the ring 44 is described above, the MGM 40 may also construction by injection molding a modulator support cage 42 under a ring of magnetic material 44 including MGM pole pieces 46 on an exterior of the ring 44 and machining away an inside portion of the ring of magnetic material 44. Further, an MGM 40 may be constructed according to the present invention without machining all of the outer ring 44 from the MGM pole pieces 46. Still further, a set of angularly spaced apart MGM pole pieces 46 may be held in position by a fixture and the modulator support cage 42 injection molded over the individual MGM pole pieces 46.

While the invention herein disclosed has been described by means of specific embodiments and applications thereof, numerous modifications and variations could be made thereto by those skilled in the art without departing from the scope of the invention set forth in the claims. For example, the outer rotor may include electro magnets, or a stator may reside outside the CMG providing an electric motor.

I claim:

1. A method for manufacturing a Magnetic Gear Modulator (MGM) of a Concentric Magnetic Gear (CMG), the method comprising:

forming a single casting of both a support ring and angularly spaced apart pole pieces, the single casting support ring and the angularly spaced apart pole pieces made of a magnetically conducting material;

molding a molding material between consecutive ones of the pole pieces; and machining off the support ring leaving angularly spaced apart pole pieces connected by the molding material.

2. The method of claim 1, wherein:

the support ring is an outer support ring residing outside the pole pieces; and the machining off the support ring includes exposing an outer face of the pole pieces.

3. The method of claim 1, wherein:

the support ring is an inner support ring residing inside the pole pieces; and the machining off the support ring includes exposing an inner face of the pole pieces.

4. The method of claim 3, wherein the molding is injection molding.

5. The method of claim 1, wherein:

the support ring is at least one end ring; and including machining off the at least one end ring.

6. The method of claim 5, wherein the molding is injection molding.

7. The method of claim 1, wherein the molding material is injection molding material.

8. The method of claim 7, wherein the injection molding material is a thermally conductive strengthening fiber filled plastic.

9. The method of claim 8, wherein the thermally conductive strengthening fiber filled plastic is selected from the group consisting of thermally conductive strengthening fiber filled plastic, a carbon fiber plastic, a carbon fiber filled plastic material, a glass material, and a high performance composite plastic.

10. The method of claim 1, wherein the magnetic material is a ferromagnetic material.

11. The method of claim 10, wherein the ferromagnetic material is selected from the group consisting of a bulk magnetic or metallic glass, a laminated bulk magnetic glass, or Soft Magnetic Composites (SMC).

12. The method of claim 1, wherein forming pole pieces comprises forming non-round cross-section pole pieces.

13. The method of claim 12, wherein the forming non-round cross-section pole pieces comprises forming pole pieces having an hour glass shaped cross-section.

14. The method of claim 1, wherein forming pole pieces comprises forming pole pieces including forming pole pieces having features resisting rotating in the MGM.

15. A method for manufacturing a Magnetic Gear Modulator (MGM) of a Concentric Magnetic Gear (CMG), the method comprising:

forming a single casting of both a support ring and angularly spaced apart pole pieces, the single casting support ring and the angularly spaced apart pole pieces made of a magnetically conducting material wherein:

the pole pieces have a non-round cross-section to resist rotating in the MGM;

injection molding a high performance composite plastic, thermally conductive injection molding material between the pole pieces;

machining off the support ring leaving exposed inner and outer faces of the pole pieces;

leaving the pole pieces connected by the injection molded material; and assembling the CMG including the MGM between inner and outer rotors.

16. A method for manufacturing a Magnetic Gear Modulator (MGM) of a Concentric Magnetic Gear (CMG), comprising:

forming a raw MGM comprising:

forming a single casting of both a support ring and angularly spaced apart pole pieces, the single casting support ring and the angularly spaced apart pole pieces made of magnetically conductive material; and molding a high performance composite plastic, thermally conductive molding material between the pole pieces;

machining away the support ring of the raw MGM; and exposing inner and outer faces of the pole pieces.

17. The method of claim 16, wherein the molding is injection molding.

* * * * *